United States Patent
Tsuji et al.

(10) Patent No.: US 11,420,631 B2
(45) Date of Patent: Aug. 23, 2022

(54) VEHICLE CONTROL DEVICE FOR PERFORMING LANE CHANGE CONTROL

(71) Applicant: HONDA MOTOR CO., LTD., Tokyo (JP)

(72) Inventors: Kanta Tsuji, Wako (JP); Yuta Takada, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 163 days.

(21) Appl. No.: 16/793,627

(22) Filed: Feb. 18, 2020

(65) Prior Publication Data
US 2020/0262437 A1 Aug. 20, 2020

(30) Foreign Application Priority Data
Feb. 19, 2019 (JP) .............................. JP2019-027056

(51) Int. Cl.
*B60W 10/10* (2012.01)
*B60W 30/18* (2012.01)

(52) U.S. Cl.
CPC ...... *B60W 30/18163* (2013.01); *B60W 10/10* (2013.01)

(58) Field of Classification Search
CPC ........... B60W 30/18163; B60W 10/10; B60W 60/001; B60W 2540/16; B60W 2540/20; B60W 50/14; B60W 2050/143; B60W 2050/146; B60K 31/00; B60Q 1/343; B60Q 9/00; F16H 61/0213; F16H 2061/0234; F16H 2061/0244

See application file for complete search history.

(56) References Cited

U.S. PATENT DOCUMENTS

| | | | |
|---|---|---|---|
| 7,505,842 B2 * | 3/2009 | Luh | B60W 30/182 701/55 |
| 7,704,187 B2 * | 4/2010 | Saito | F16H 61/16 477/110 |
| 10,990,098 B2 * | 4/2021 | Kishi | B60W 50/06 |
| 2013/0178333 A1 * | 7/2013 | Plath | F16H 61/0213 477/94 |
| 2016/0363213 A1 * | 12/2016 | Adames | F16H 61/0213 |

(Continued)

FOREIGN PATENT DOCUMENTS

| | | | |
|---|---|---|---|
| DE | 10209840 A1 * | 9/2002 | F16H 59/0204 |
| DE | 102009020810 A1 * | 12/2009 | F16H 61/0213 |

(Continued)

*Primary Examiner* — Donald J Wallace
*Assistant Examiner* — Daniel M. Robert
(74) *Attorney, Agent, or Firm* — Carrier Blackman & Associates, P.C.; Joseph P. Carrier; Jeffrey T. Gedeon (57) ABSTRACT

A vehicle control device includes: a transmission control unit that can select a restricted mode in which the range of a gear ratio of a transmission is restricted and an unrestricted mode in which the range of the gear ratio is not restricted, and controls the gear ratio in accordance with the selected transmission mode; and a lane change control unit that, if the unrestricted mode is selected in a case where a lane change request has been acquired, keeps the unrestricted mode and performs lane change control in which a host vehicle changes lanes, and if the restricted mode is selected in the case where the lane change request has been acquired, selects the unrestricted mode and performs the lane change control.

8 Claims, 9 Drawing Sheets

(56) References Cited

U.S. PATENT DOCUMENTS

2017/0334454 A1* 11/2017 Abe .................. B60W 50/0098
2018/0093676 A1* 4/2018 Emura ................. G05D 1/0061

FOREIGN PATENT DOCUMENTS

| JP | 2000-296724 A | 10/2000 |
| JP | 2000296724 * | 10/2000 |
| JP | 4073680 B2 * | 4/2008 |

* cited by examiner

_(1)_
VEHICLE CONTROL DEVICE FOR PERFORMING LANE CHANGE CONTROL

CROSS-REFERENCE TO RELATED APPLICATION

This application is based upon and claims the benefit of priority from Japanese Patent Application No. 2019-027056 filed on Feb. 19, 2019, the contents of which are incorporated herein by reference.

BACKGROUND OF THE INVENTION

Field of the Invention

The present invention relates to a vehicle control device that performs lane change control in which a host vehicle changes lanes, a vehicle including the vehicle control device, and a vehicle control method that performs the lane change control in which the host vehicle changes lanes.

Description of the Related Art

Japanese Laid-Open Patent Publication No. 2000-296724 discloses that when a vehicle changes travel lanes, it is prohibited to change a gear ratio of transmission means that transmits motive power from a driving source of the vehicle to wheels.

SUMMARY OF THE INVENTION

In a case where lane change control in which the host vehicle changes lanes is performed, if the range of the gear ratio is fixed, there has been a problem that the host vehicle may be unable to control acceleration or deceleration smoothly.

The present invention has been made to solve the above problem and an object is to provide a vehicle control device, a vehicle, and a vehicle control method in which a host vehicle can be accelerated or decelerated smoothly when lane change control is performed.

A vehicle control device according to a first aspect of the present invention includes: a transmission control unit configured to select, as a transmission mode, a restricted mode in which a range of a gear ratio of a transmission is restricted and an unrestricted mode in which the range of the gear ratio is not restricted, and configured to control the gear ratio in accordance with the selected transmission mode; a lane change request acquisition unit configured to acquire a lane change request; and a lane change control unit configured to, if the unrestricted mode is selected in a case where the lane change request has been acquired, keep the unrestricted mode and perform lane change control in which a host vehicle changes lanes, and if the restricted mode is selected in the case where the lane change request has been acquired, select the unrestricted mode and perform the lane change control.

A vehicle according to a second aspect of the present invention includes the vehicle control device according to the first aspect.

A vehicle control method according to a third aspect of the present invention includes: a transmission control step of selecting, as a transmission mode, a restricted mode in which a range of a gear ratio of a transmission is restricted and an unrestricted mode in which the range of the gear ratio is not restricted, and controlling the gear ratio in accordance with the selected transmission mode; a lane change request acquisition step of acquiring a lane change request; and a lane change control step of, if the unrestricted mode is selected in a case where the lane change request has been acquired, keeping the unrestricted mode and performing lane change control in which a host vehicle changes lanes, and if the restricted mode is selected in the case where the lane change request has been acquired, selecting the unrestricted mode and performing the lane change control.

If the lane change control is performed by the vehicle control device, the vehicle, and the vehicle control method according to the present invention, the host vehicle can be accelerated or decelerated smoothly.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

First Embodiment

[Configuration of Vehicle]

Figure 1:
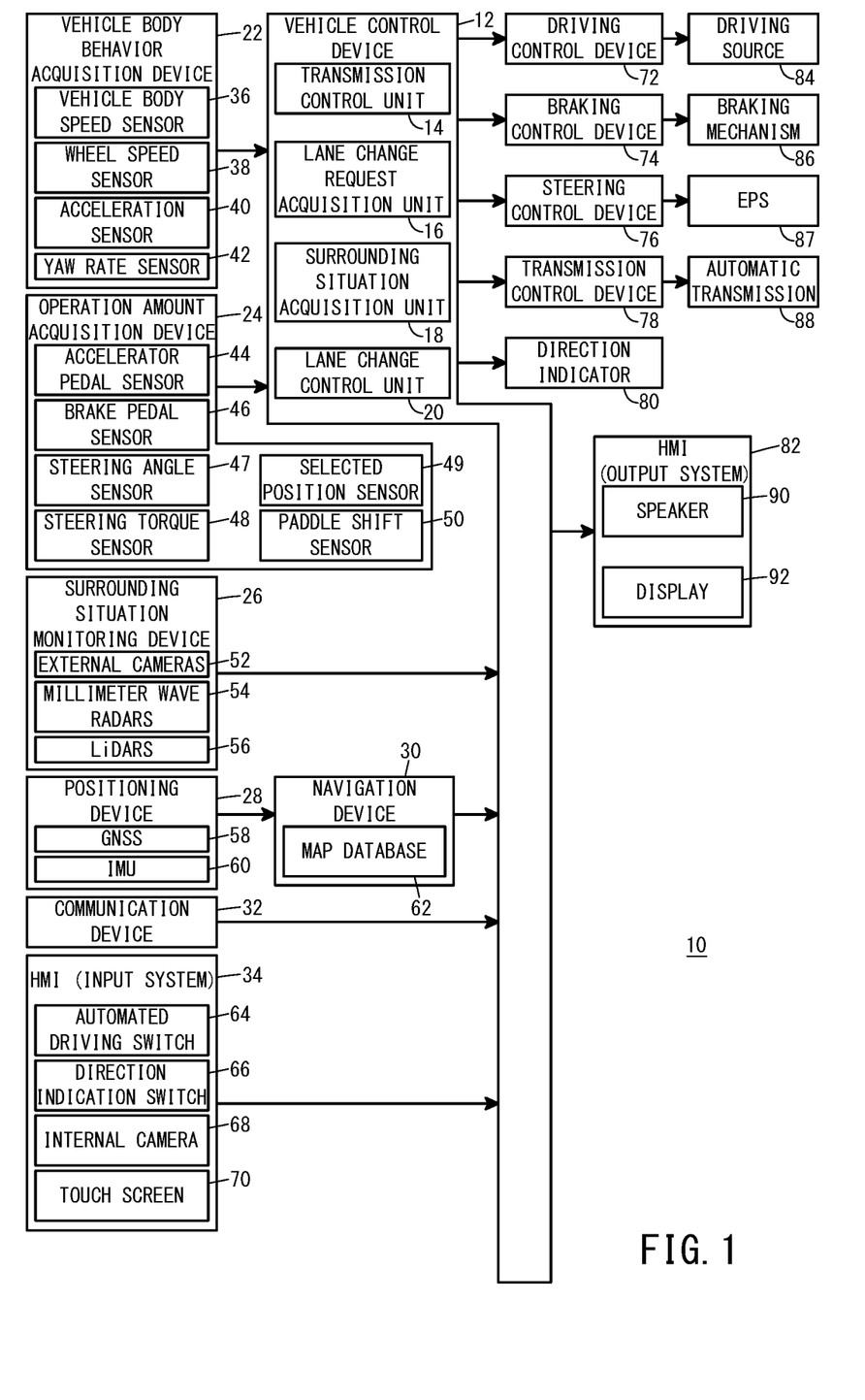
FIG. 1 is a block diagram illustrating a configuration of a vehicle according to an embodiment.

FIG. 1 is a block diagram illustrating a configuration of a vehicle 10 according to a first embodiment. The vehicle 10 according to the present embodiment includes a vehicle control device 12. The vehicle control device 12 includes a transmission unit 14, a lane change request acquisition unit 16, a surrounding situation acquisition unit 18, and a lane change unit 20.

The transmission unit 14 sets a transmission mode on the basis of positional information of a selection lever 94 (FIG. 2) that is acquired from a selected position sensor 49 to be described below, and operation information of a paddle shift switch 96 (FIG. 3) that is acquired from a paddle shift sensor 50. Moreover, the transmission unit 14 sets a shift position or a gear ratio of an automatic transmission 88 to be described below on the basis of the transmission mode that is set.

The lane change request acquisition unit 16 acquires a lane change request from a user. When the user operates a direction indication switch 66 to be described below in a state where an automated driving switch 64 to be described below is on, the lane change request acquisition unit 16 determines that the user performs the lane change request.

Note that in the present embodiment, when the user determines that the vehicle 10 will change lanes and then operates the direction indication switch 66, lane change control to be described below is started. Alternatively, in the present embodiment, when the lane change unit 20 determines that the vehicle 10 will change lanes and suggests the lane change to the user, and thereafter the user operates the direction indication switch 66, the lane change control is started. The operation for the direction indication switch 66 by the user corresponds to the request for the lane change from the user.

On the other hand, when the lane change unit 20 determines that the vehicle 10 will change lanes, the lane change control may be started without the user's operation for the direction indication switch 66. In this case, the lane change unit 20 transmits a signal indicating the lane change request to the lane change request acquisition unit 16.

The surrounding situation acquisition unit 18 acquires a surrounding situation of the vehicle 10 from a surrounding situation monitoring device 26 to be described below.

The lane change unit 20 performs the lane change control in which the vehicle 10 (hereinafter, also referred to as a host vehicle 10) changes lanes on the basis of the acquired surrounding situation. When the lane change control is performed, the lane change unit 20 sets the aforementioned transmission mode, and sets the shift position or the gear ratio of the automatic transmission 88.

A computer executes programs stored in a storage medium (not shown), so that the transmission unit 14, the lane change request acquisition unit 16, the surrounding situation acquisition unit 18, and the lane change unit 20 are achieved.

The transmission unit 14, the lane change request acquisition unit 16, and the lane change unit 20 are described below in detail.

As input devices that input various pieces of information to the vehicle control device 12, the vehicle 10 includes a vehicle body behavior acquisition device 22, an operation amount acquisition device 24, the surrounding situation monitoring device 26, a positioning device 28, a navigation device 30, a communication device 32, and an input system human machine interface (hereinafter, HMI) 34.

The vehicle body behavior acquisition device 22 acquires vehicle body behavior information of the vehicle 10. As the vehicle body behavior acquisition device 22, the vehicle 10 includes a vehicle body speed sensor 36 that acquires vehicle body speed, a wheel speed sensor 38 that acquires wheel speed, an acceleration sensor 40 that acquires a front-rear acceleration, a lateral acceleration, and an up-down acceleration of the vehicle 10, and a yaw rate sensor 42 that acquires a yaw rate of the vehicle 10.

The operation amount acquisition device 24 acquires operation amount information of user's driving operation. As the operation amount acquisition device 24, the vehicle 10 includes an accelerator pedal sensor 44 that acquires the operation amount of an accelerator pedal, a brake pedal sensor 46 that acquires the operation amount of a brake pedal, a steering angle sensor 47 that acquires the steering angle of a steering wheel 98 (FIG. 3), a steering torque sensor 48 that acquires the steering torque that is applied to the steering wheel 98, the selected position sensor 49 that acquires the position of the selection lever 94, and the paddle shift sensor 50 that acquires the operation amount of a paddle shift switch 96.

The surrounding situation monitoring device 26 monitors the surrounding situation of the host vehicle 10. The surrounding situation refers to a situation of other vehicles, buildings, marks, and lanes around the host vehicle 10, for example. As the surrounding situation monitoring device 26, the vehicle 10 includes a plurality of external cameras 52 that photograph the outside of the vehicle 10, a plurality of millimeter wave radars 54 that acquire the distance between a detected object and the vehicle 10 by using millimeter waves, and a plurality of laser radars (LiDARs) 56 that acquire the distance between the detected object and the vehicle 10 by using laser light (infrared radiation), for example.

The positioning device 28 acquires positional information of the host vehicle 10. As the positioning device 28, the vehicle 10 includes a global navigation satellite system (GLASS) 58 that measures the position of the vehicle 10 by using a signal output from an artificial satellite, and an inertial measurement unit (IMU) 60 that acquires three-dimensional behavior of the vehicle 10 by using a triaxial gyroscope and an acceleration sensor in three directions.

The navigation device 30 causes a display 92 (described below) to display a map that is created based on a map database 62 and, on this map, the positional information of the vehicle 10 that is acquired by the positioning device 28 is displayed. Moreover, when the user operates a touch screen 70 to be described below so as to set a destination of the vehicle 10, the navigation device 30 sets a target route from the current position to the destination. On the basis of the set target route, the display 92 displays route guidance and a speaker 90 to be descried below outputs a route guidance voice. The information of the map database 62 and the target route information that is set by the navigation device 30 are input to the vehicle control device 12.

The communication device 32 performs wireless communication with an external equipment (not shown). Examples of the external equipment include an external server. The communication device 32 may be provided to the vehicle 10 dedicatedly, for example, like a telematics control unit (TCU). Alternatively, a mobile phone, a smart phone, or the like may be used as the communication device 32.

When the user operates the input system HMI 34, the input system HMI 34 transmits a predetermined signal to the vehicle control device 12. As the input system HMI 34, the vehicle 10 according to the present embodiment includes the automated driving switch 64, the direction indication switch 66, an internal camera 68, and the touch screen 70.

The automated driving switch 64 is a switch that is operated by the user and used to start (turn on) or stop (turn off) automated driving control.

The direction indication switch 66 is a switch that is operated by the user and used to set direction indicators 80, which are described below, to a state where a left direction indicator 80 blinks, a state where a right direction indicator 80 blinks, or a state where the blink of the direction indicator 80 is stopped. The direction indication switch 66 is a lever that is provided to a steering column; however, the direction indication switch 66 may be a button that is provided to the steering column, for example.

Note that if the automated driving control is on, when the user operates the direction indication switch 66, the direction indication switch 66 is also used as a switch to select the direction where the lane change will be automatically performed. If the direction indication switch 66 is the lever, for example, when the operation position of the direction indication switch 66 is a first operation position, the direction indication switch 66 is used as a switch in order to automatically perform the lane change. On the other hand, when the operation position of the direction indication switch 66 is a second operation position whose operation amount of the lever from a neutral position is larger than that of the first operation position, the direction indication switch 66 is used as a switch that blinks the direction indicator 80. If the direction indication switch 66 is the button, the first operation position and the second operation position may be set in accordance with the pushing amount of the button.

The internal camera 68 is a camera that photographs the inside of a vehicle compartment of the vehicle 10.

The touch screen 70 is a transparent member with a film shape, and is stuck on a screen of the display 92 to be described below. The touch screen 70 acquires information about an operation position which the finger of the user, a stylus, or the like touches. An instruction of the user is input to the vehicle control device 12 on the basis of the relation between the information about the operation position that is acquired by the touch screen 70 and a display position of an icon or the like that is displayed on the display 92.

As an output device to which an instruction signal from the vehicle control device 12 is output, the vehicle 10 includes a driving control device 72, a braking control device 74, a steering control device 76, a transmission control device 78, the direction indicator 80, and an output system HMI 82.

The driving control device 72 controls driving torque that is output from a driving source 84. The driving source 84 is one or both of an engine and a traction motor. If the automated driving control is off, the driving control device 72 controls the driving torque of the driving source 84 on the basis of the operation amount of the accelerator pedal by the user. If the automated driving control is on, the driving control device 72 controls the driving torque of the driving source 84 on the basis of the instruction from the vehicle control device 12.

The braking control device 74 controls braking torque of a braking mechanism 86. The braking mechanism 86 is a friction brake or both the friction brake and a regeneration brake. If the automated driving control is off, the braking control device 74 controls the braking torque on the basis of the operation amount of the brake pedal by the user. If the automated driving control is on, the braking control device 74 controls the braking torque on the basis of the instruction from the vehicle control device 12.

The steering control device 76 controls an electric power steering (hereinafter, referred to as EPS) 87 so as to control the steering angle and steering reaction force of the steering wheel 98, and the turning angle of turning wheels. If the automated driving control is off, the steering control device 76 controls the steering reaction force of the steering wheel 98 and the turning angle of the turning wheels in accordance with the steering angle of the steering wheel 98 by the user. If the automated driving control is on, the steering control device 76 controls the steering angle and the steering reaction force of the steering wheel 98 and the turning angle of the turning wheels in accordance with the instruction from the vehicle control device 12. Note that instead of the EPS 87, a hydraulic power steering may be used.

The transmission control device 78 controls the automatic transmission 88 in accordance with the shift position or the gear ratio that is set by the transmission unit 14 of the vehicle control device 12. The automatic transmission 88 may be any one of a multi-speed transmission (step AT), a continuously variable transmission (CVT), a dual clutch transmission (DCT), an automatic manual transmission (AMT), and the like.

The direction indicators 80 are provided to left and right sides of the vehicle 10, and one of the left and right direction indicators 80 blinks on the basis of the user's operation for the direction indication switch 66.

The output system HMI 82 performs provision or notification of information to the user by an image or a sound. As the HMI 82, the vehicle 10 according to the present embodiment includes the speaker 90 and the display 92. The speaker 90 performs the provision or the notification of the information to the user by the sound. The display 92 performs the provision or the notification of the information to the user by the image.

[Selection Lever and Paddle Shift Switch]

Figure 2:
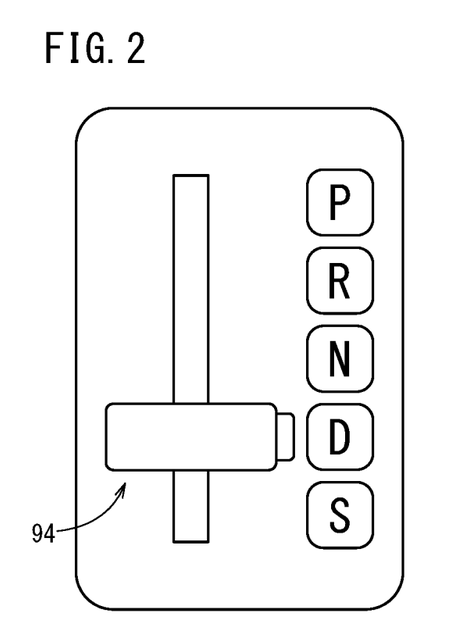
FIG. 2 is a schematic diagram of a selection lever.

FIG. 2 is a schematic diagram of the selection lever 94. By the user's operation, the selection lever 94 can select one of a P (parking) mode, an R (reverse) mode, an N (neutral) mode, a D (drive) mode, and an S (sport) mode.

Note that the selection lever 94 may be able to select each mode by a mechanical link, or by using by-wire technology. In a case where the by-wire technology is employed, instead of the selection lever 94, a button type or a dial type may be employed. In the button type, when the user operates a button, each mode can be selected. In the dial type, when the user operates a dial, each mode can be selected.

Figure 3:
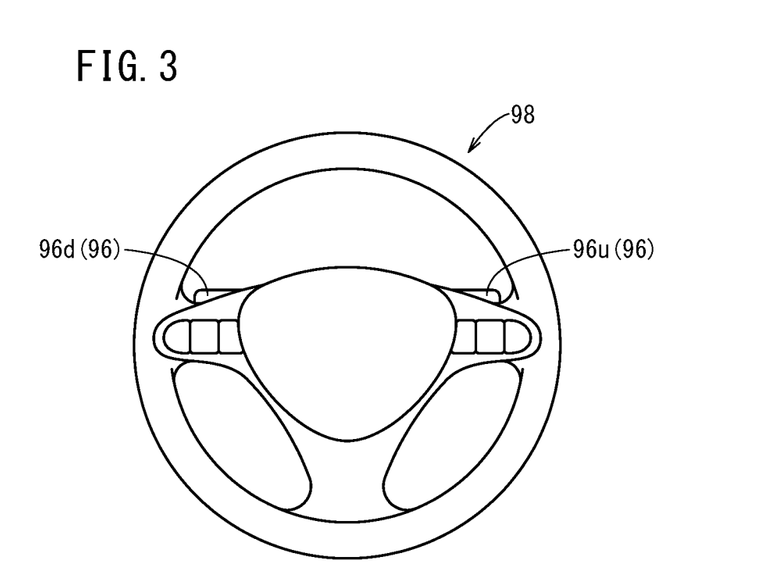
FIG. 3 is a schematic diagram of a paddle shift switch.

FIG. 3 is a schematic diagram of the paddle shift switch 96. As illustrated in FIG. 3, the paddle shift switch 96 is provided to the back of the steering wheel 98. Thus, in a state where the user grips the steering wheel 98, the user can operate the paddle shift switch 96. The paddle shift switch 96 includes an up-shift switch 96*u* and a down-shift switch 96*d*.

In a state where the selection lever 94 is operated such that the D mode or the S mode is selected, every time the user operates the up-shift switch 96*u*, the automatic transmission 88 is controlled such that the shift position is changed to a higher side by one gear position. In a case where the automatic transmission 88 is the continuously variable transmission, every time the user operates the up-shift switch 96*u*, the automatic transmission 88 is controlled such that the gear ratio is changed to the higher side by a predetermined gear ratio. In a state where the selection lever 94 has been operated such that the D mode or the S mode is selected, every time the user operates the down-shift switch 96*d*, the automatic transmission 88 is controlled such that the shift position is changed to a lower side by one gear position. In the case where the automatic transmission 88 is the continuously variable transmission, every time the user operates the down-shift switch 96*d*, the automatic transmission 88 is controlled such that the gear ratio is changed to the lower side by the predetermined gear ratio.

[State Transition of Transmission Mode]

Figure 4:
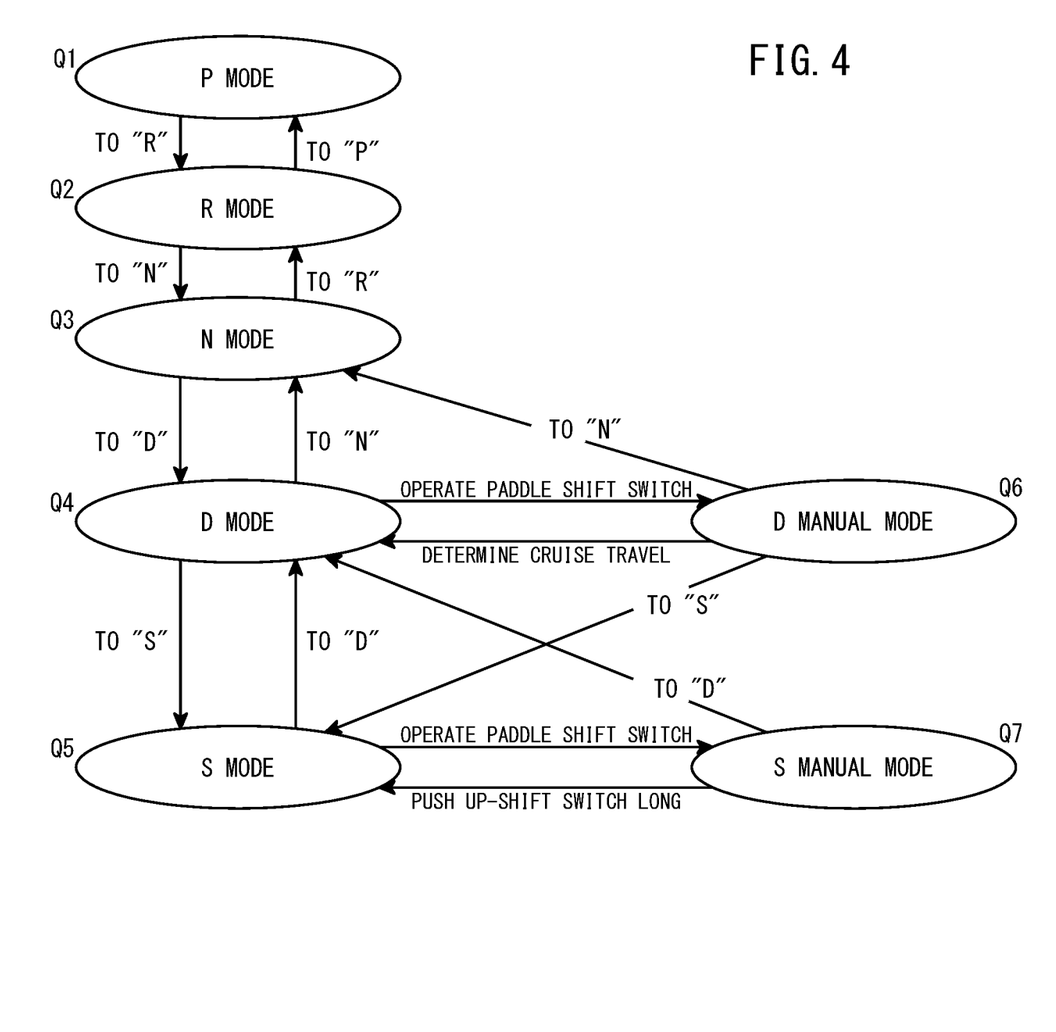
FIG. 4 is a state transition diagram of a transmission mode.

FIG. 4 is a state transition diagram of the transmission mode. In accordance with the state transition diagram in FIG. 4, the transmission unit 14 sets the transmission mode.

When the selection lever 94 is shifted to the position of "P", a state is changed to a state Q1 and the transmission unit 14 selects the P mode as the transmission mode. If the P mode is selected, the transmission control device 78 controls the automatic transmission 88 such that a parking lock (not shown) is performed.

When the selection lever 94 is shifted to the position of "R", the state is changed to a state Q2 and the transmission unit 14 selects the R mode as the transmission mode. In a case where the automatic transmission 88 is the multi-speed transmission or the continuously variable transmission, if the R mode is selected, the transmission control device 78 controls a forward-backward switch device (not shown) such that the forward-backward switch device is changed to backward. In a case where the automatic transmission 88 is the dual clutch transmission or the automatic manual transmission, if the R mode is selected, the automatic transmission 88 is controlled such that an output shaft (not shown) and a counter shaft (not shown) are mechanically connected with each other through a reverse gear.

When the selection lever 94 is shifted to the position of "N", the state is changed to a state Q3 and the transmission unit 14 selects the N mode as the transmission mode. If the N mode is selected, the transmission control device 78 controls the automatic transmission 88 such that a start clutch (not shown) is released.

When the selection lever 94 is shifted to the position of "D", the state is changed to a state Q4 and the transmission unit 14 selects the D mode as the transmission mode. If the D mode is selected, the transmission unit 14 sets the shift position or the gear ratio in accordance with the operation amount of the accelerator pedal, vehicle speed, or the like, and the transmission control device 78 controls the automatic transmission 88 in accordance with the shift position or the gear ratio that is set. In the D mode, transmission control is performed in order to achieve both good fuel efficiency and motive power performance. Note that the D mode corresponds to an unrestricted mode according to the present invention.

When the selection lever 94 is shifted to the position of "S", the state is changed to a state Q5 and the transmission unit 14 selects the S mode as the transmission mode. If the S mode is selected, the transmission unit 14 sets the shift position or the gear ratio in accordance with the operation amount of the accelerator pedal or the like, and the transmission control device 78 controls the automatic transmission 88 in accordance with the shift position or the gear ratio that is set. In the S mode, the transmission control is performed in order to improve the motive power performance more than in the D mode. Note that the S mode corresponds to a restricted mode according to the present invention.

When the paddle shift switch 96 is operated in the D mode, the state is changed to a state Q6 and the transmission unit 14 selects a D manual mode as the transmission mode. If the D manual mode is selected, every time the up-shift switch 96*u* is operated, the transmission unit 14 changes the shift position of the automatic transmission 88 to the higher side by one gear position or the gear ratio to the higher side by the predetermined gear ratio, and the transmission control device 78 controls the automatic transmission 88 in accordance with the shift position or the gear ratio that is set. If the D manual mode is selected, every time the down-shift switch 96*d* is operated, the transmission unit 14 changes the shift position of the automatic transmission 88 to the lower side by one gear position or the gear ratio to the lower side by the predetermined gear ratio, and the transmission control device 78 controls the automatic transmission 88 in accordance with the shift position or the gear ratio that is set.

When the host vehicle 10 is traveling in a downhill in the D mode, if the user wants to make engine brake work more, the user takes one action of operating the down-shift switch 96*d* to change the automatic transmission 88 to the lower side. The transmission unit 14 determines that a travel state of the vehicle 10 in which the change in the operation amount of the accelerator pedal by the user is small and the change in vehicle speed of the vehicle 10 is small is a cruise travel state. In a case where it is determined that the travel state is the cruise travel state in the D manual mode, the transmission unit 14 returns the transmission mode to the D mode. Note that the D manual mode corresponds to the restricted mode or a first restricted mode according to the present invention.

When the paddle shift switch 96 is operated in the S mode, the state is changed to a state Q7 and the transmission unit 14 selects an S manual mode as the transmission mode. If the S manual mode is selected, every time the up-shift switch 96*u* is operated, the transmission unit 14 changes the shift position of the automatic transmission 88 to the higher side by one gear position or the gear ratio to the higher side by the predetermined gear ratio, and the transmission control device 78 controls the automatic transmission 88 in accordance with the shift position or the gear ratio that is set. If the S manual mode is selected, every time the down-shift switch 96*d* is operated, the transmission unit 14 changes the shift position of the automatic transmission 88 to the lower side by one gear position or the gear ratio to the lower side by the predetermined gear ratio, and the transmission control device 78 controls the automatic transmission 88 in accordance with the shift position or the gear ratio that is set.

In the S manual mode, the user feels as if he/she operated a manual transmission (MT). In the S manual mode, if the up-shift switch 96*u* is pushed for a long time, the transmission unit 14 returns the transmission mode to the S mode. Note that the S manual mode corresponds to the restricted mode or a second restricted mode according to the present invention.

[Display on Instrument Panel]

FIG. 5A, FIG. 5B, FIG. 6A, and FIG. 6B are diagrams illustrating display on an instrument panel 100. The instrument panel 100 includes a selection lever operation position display part 102 showing the operation position of the selection lever 94, a shift position display part 104 showing the current shift position, and a manual mode display part 106 that blinks when the transmission mode is the S manual mode.

The selection lever operation position display part 102 displays the position of the selection lever 94. Note that the selection lever operation position display part 102 illustrated in FIG. 5A and FIG. 5B indicates that the selection lever 94 is at the position "D", and the selection lever operation position display part 102 illustrated in FIG. 6A and FIG. 6B indicates that the selection lever 94 is at the position "S".

Figure 5A:
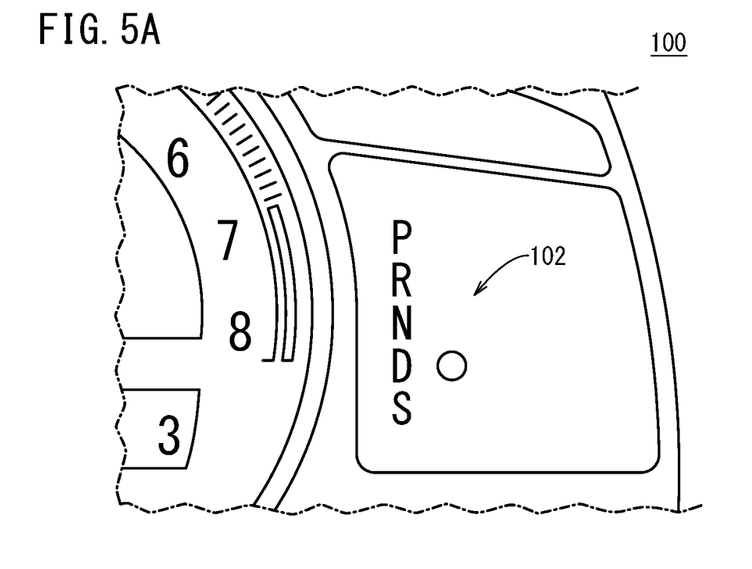
FIG. 5A and FIG. 5B are diagrams illustrating display on an instrument panel.
Figure 5B:
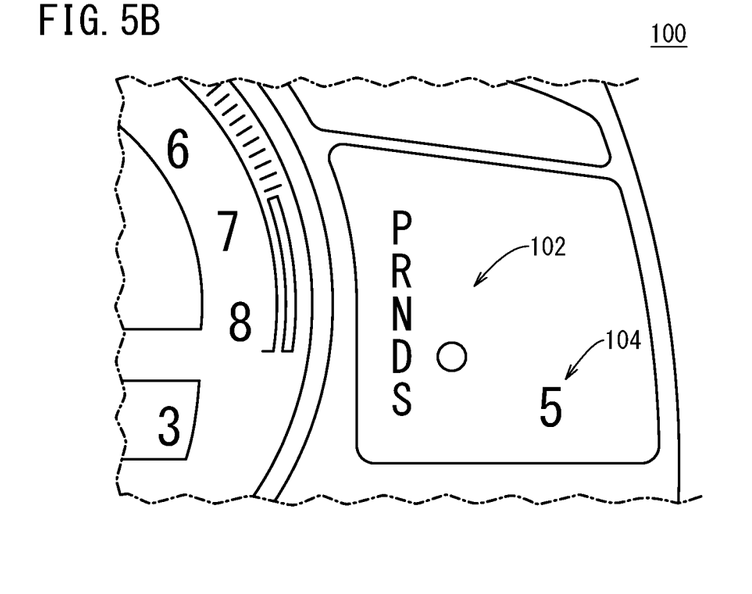
Figure 6A:
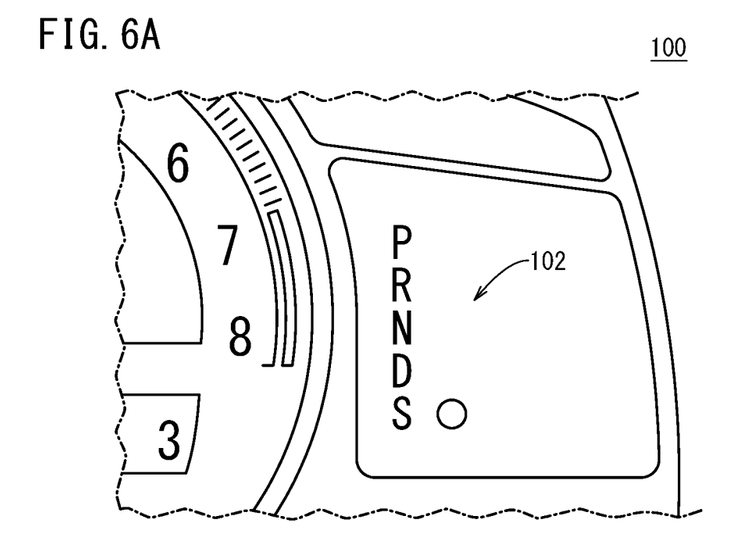
FIG. 6A and FIG. 6B are diagrams illustrating display on the instrument panel.
Figure 6B:
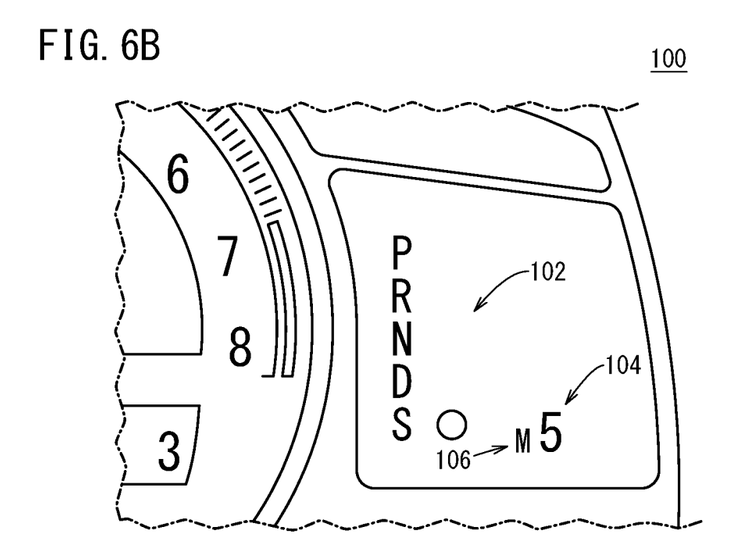

When the transmission mode is the D manual mode or the S manual mode, the shift position display part 104 displays the number expressing the current shift position as illustrated in FIG. 5B and FIG. 6B. Note that in the case where the automatic transmission 88 is the continuously variable transmission, the number of the shift position that is set in accordance with the gear ratio in advance is displayed.

When the transmission mode is the S mode, the letter "M" is displayed on the manual mode display part 106 as illustrated in FIG. 6B.

[Lane Change Control Process]

Figure 7:
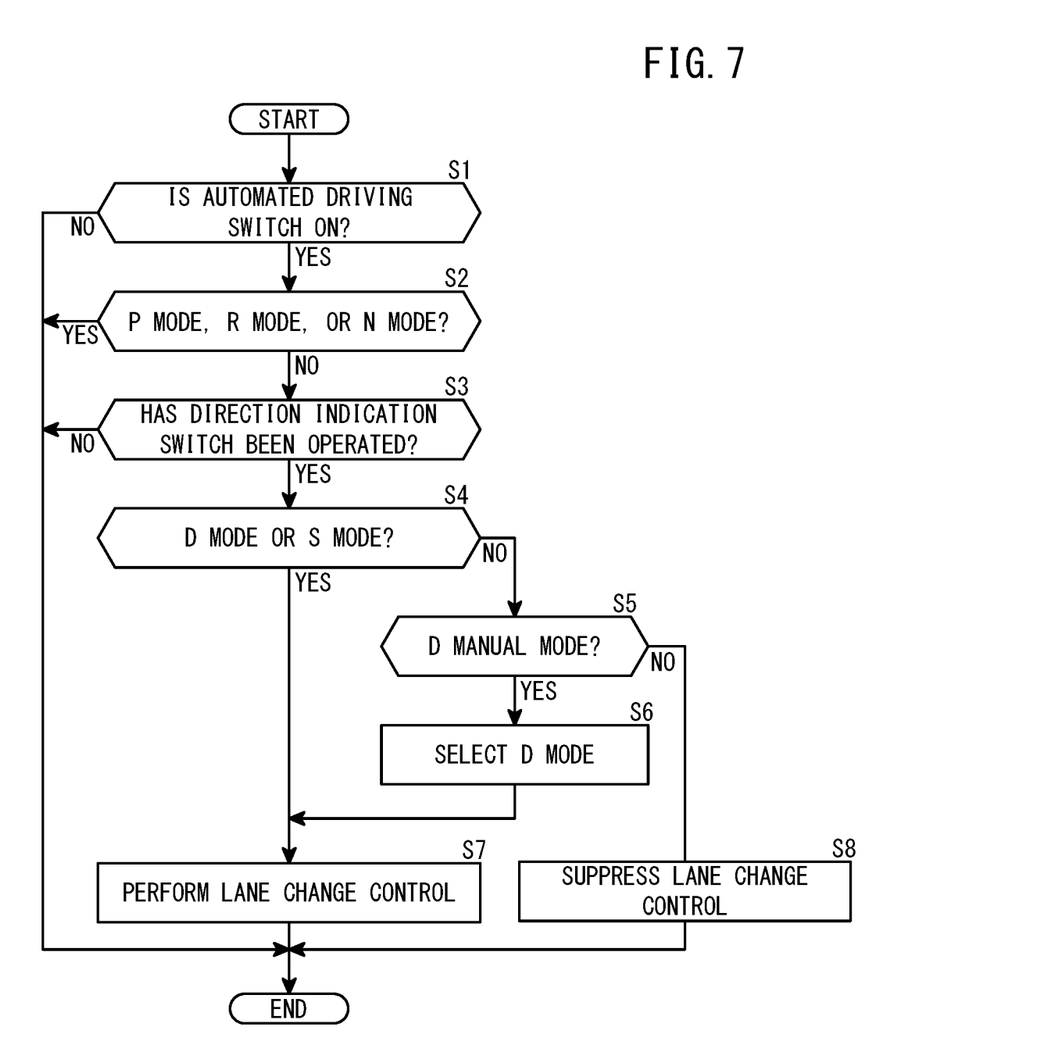
FIG. 7 is a flowchart illustrating a lane change control process performed in a vehicle control device.

FIG. 7 is a flowchart illustrating a lane change control process performed by the vehicle control device 12 according to the present embodiment. The lane change control process is performed on a predetermined cycle in a state where the vehicle 10 is in operation.

In step S1, the lane change unit 20 determines whether the automated driving switch 64 is on. If the automated driving switch 64 is on, the process advances to step S2, and if the automated driving switch 64 is off, the lane change control process ends.

In step S2, the lane change unit 20 determines whether the P mode, the R mode, or the N mode is selected as the transmission mode. If the P mode, the R mode, or the N mode is selected, the lane change control process ends, and if the P mode, the R mode, and the N mode are not selected, the process advances to step S3.

In step S3, the lane change request acquisition unit 16 determines whether the direction indication switch 66 has been operated. If the direction indication switch 66 has been operated, the process advances to step S4, and if the direction indication switch 66 has not been operated, the lane change control process ends. If the automated driving switch 64 is on and the direction indication switch 66 has been operated, it means that the lane change request acquisition unit 16 has acquired the lane change request from the user.

If the lane change unit 20 determines that the vehicle 10 will change lanes, and if the lane change control is started without the user's operation for the direction indication switch 66, step S3 may be performed as follows.

In step S3, the lane change request acquisition unit 16 determines whether the signal indicating the lane change request from the lane change unit 20 has been acquired. If the signal indicating the lane change request has been acquired, the process advances to step S4, and if the signal indicating the lane change request has not been acquired, the lane change control process ends.

In step S4, the lane change unit 20 determines whether the D mode or the S mode is selected as the transmission mode. If the D mode or the S mode is selected, the process advances to step S7, and if the D mode and the S mode are not selected, the process advances to step S5.

In step S5, the lane change unit 20 determines whether the D manual mode is selected as the transmission mode. If the D manual mode is selected, the process advances to step S6, and if the D manual mode is not selected, the process advances to step S8.

In step S6, the lane change unit 20 selects the D mode as the transmission mode, and the process advances to step S7.

In step S7, the lane change unit 20 performs the lane change control in the direction to which the direction indication switch 66 has been operated on the basis of the surrounding situation of the host vehicle 10 acquired by the surrounding situation acquisition unit 18, and the lane change control process ends. After the lane change control in step S7 is ended, the lane change unit 20 keeps the transmission mode in the lane change control. That is to say, in step S6, even if the transmission mode is changed from the D manual mode to the D mode, the lane change unit 20 keeps the D mode after the lane change control.

If the D mode, the S mode, and the D manual mode are not selected as the transmission mode (NO in step S4 and step S5), it means that the S manual mode is selected. In this case, the process advances to step S8. In step S8, the lane change unit 20 suppresses the lane change control, and the process ends. Suppressing the lane change control means that the lane change control is not performed.

As described in the above flowchart of the lane change control process, if the transmission mode before the lane change control is started is the D mode or the S mode, the lane change unit 20 keeps the transmission mode before the lane change control is started and performs the lane change control. Moreover, if the transmission mode before the lane change control is started is the D manual mode, the lane change unit 20 selects the D mode and performs the lane change control. Furthermore, if the transmission mode before the lane change control is started is the S manual mode, the lane change unit 20 suppresses the lane change control.

Note that if the user steers the steering wheel 98, for example, in the lane change control in step S7, the lane change unit 20 cancels the lane change control. If the lane change control is canceled, the lane change unit 20 returns the transmission mode to the transmission mode before the lane change control is started. That is to say, in step S6, if the transmission mode has been changed from the D manual mode to the D mode, the lane change unit 20 returns the transmission mode to the D manual mode after the lane change control is canceled.

Moreover, during the lane change control in step S7, even if the user operates the paddle shift switch 96, the lane change unit 20 does not select the D manual mode or the S manual mode, and keeps the D mode or the S mode.

[Operation Effect]

The transmission unit 14 according to the present embodiment can select the D mode, the D manual mode, the S mode, and the S manual mode as the transmission mode. Among these modes, the D mode and the S mode are the unrestricted modes in which the transmission unit 14 can set the shift position or the gear ratio in the range of the shift position or the gear ratio that can be changed in the automatic transmission 88. On the other hand, the D manual mode and the S manual mode are the restricted modes in which the shift position or the gear ratio that can be set by the transmission unit 14 is fixed to the shift position that is selected by the user's operation for the paddle shift switch 96 or the gear ratio in accordance with the shift position.

When the lane change unit 20 performs the lane change control of the host vehicle 10, the host vehicle 10 needs to accelerate or decelerate. However, if the restricted mode is selected and the shift position or the gear ratio of the automatic transmission 88 is set to the higher side, the automatic transmission 88 cannot be changed to the lower side. Thus, there has been a problem that the host vehicle 10 may be unable to be accelerated or decelerated smoothly.

In view of the above, if the D mode is selected before the lane change control is started, the lane change unit 20 of the vehicle control device 12 according to the present embodiment performs the lane change control of the host vehicle 10 while keeping the D mode. Moreover, if the D manual mode is selected before the lane change control, the lane change unit 20 selects the D mode and then, performs the lane change control of the host vehicle 10. Thus, in the lane change control of the host vehicle 10, the lane change unit 20 can set the shift position or the gear ratio of the automatic transmission 88 in accordance with the travel state of the host vehicle 10. Therefore, the host vehicle 10 can be accelerated or decelerated smoothly in the lane change control.

If the S mode is selected before the lane change control is started, the lane change unit 20 of the vehicle control device 12 according to the present embodiment performs the lane change control of the host vehicle 10 while keeping the S mode. Moreover, if the S manual mode is selected before the lane change control is started, the lane change unit 20 suppresses the lane change control. The S manual mode is the transmission mode that the user selects in order to feel as if he/she operated the manual transmission. In the S manual mode, the user operates the paddle shift switch 96, such that the shift position or the gear ratio intended by the user is achieved, and at the same time, the lane change control is prevented in the state where the host vehicle 10 cannot be accelerated or decelerated smoothly in the lane change control.

If the D manual mode is selected before the lane change control is started, the lane change unit 20 of the vehicle control device 12 according to the present embodiment selects the D mode and then, performs the lane change control of the host vehicle 10. After the lane change control, the D mode is kept. Since the lane to which the host vehicle 10 has come is different from the original lane in a travel environment, the transmission mode is changed to the D mode. Thus, the host vehicle 10 can travel smoothly by the D mode corresponding to the unrestricted mode.

If the D manual mode is selected before the lane change control is started, the lane change unit 20 of the vehicle control device 12 according to the present embodiment selects the D mode and then, performs the lane change control of the host vehicle 10. After the lane change control is canceled, the transmission mode is returned to the D manual mode. If the D manual mode is selected, it is assumed that the user intends to increase the deceleration by making the engine brake work more. If the lane change control is canceled, the host vehicle 10 returns to the original lane whose travel environment is the travel environment before the lane change control is started. Thus, when the transmission mode is returned to the D manual mode that was selected before the lane change control, the shift position or the gear ratio that is suitable for the travel environment of the host vehicle 10 is selected.

Even if the user operates the paddle shift switch 96 during the lane change control, the lane change unit 20 of the vehicle control device 12 according to the present embodiment keeps the D mode or the S mode, and does not select the D manual mode or the S manual mode. Thus, in the lane change control of the host vehicle 10, the lane change unit 20 can set the shift position or the gear ratio of the automatic transmission 88 in accordance with the travel state of the host vehicle 10. Therefore, the host vehicle 10 can accelerate or decelerate smoothly in the lane change control.

Second Embodiment

The lane change control process in the vehicle control device 12 according to a second embodiment is different from that in the vehicle control device 12 according to the first embodiment. The other configurations and the like in the second embodiment are the same as those in the first embodiment.

[Lane Change Control Process]

Figure 8:
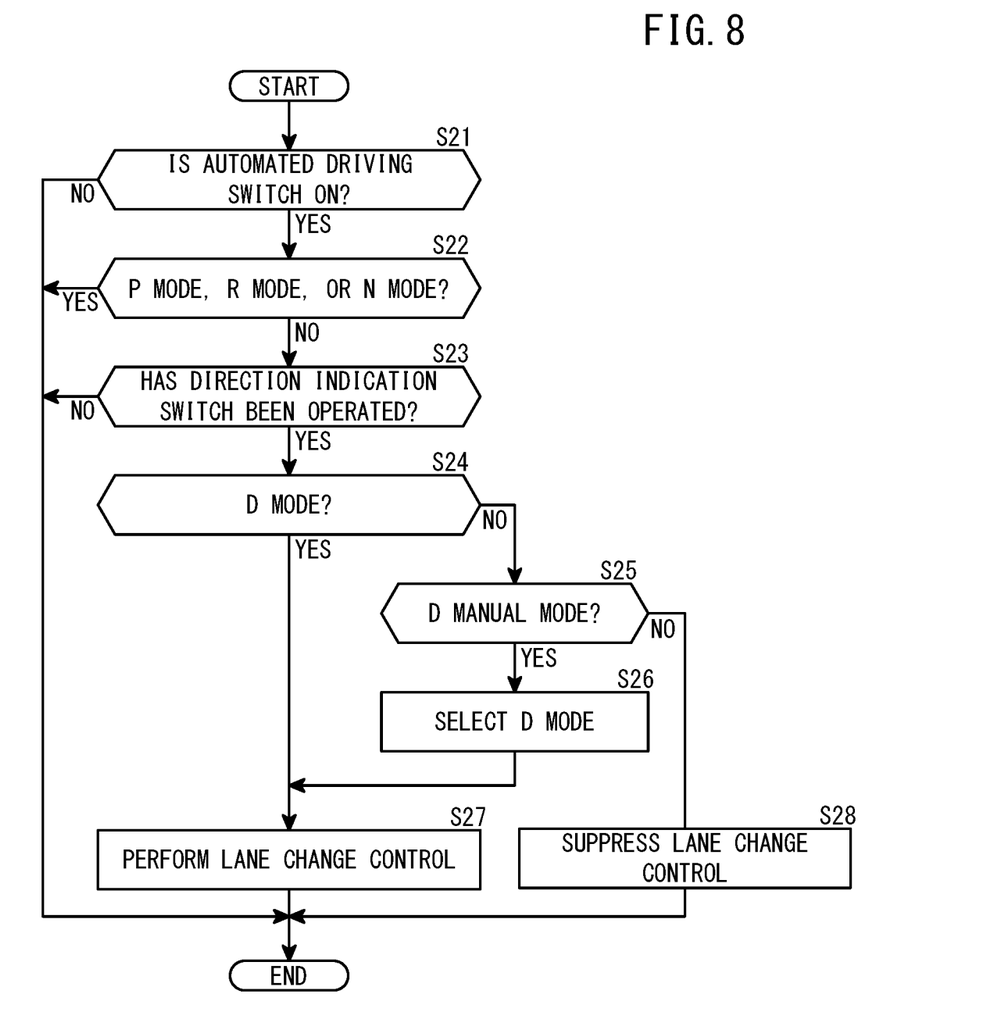
FIG. 8 is a flowchart illustrating the lane change control process performed in the vehicle control device.

FIG. 8 is a flowchart illustrating the lane change control process performed by the vehicle control device 12 according to the present embodiment. The lane change control process is performed on the predetermined cycle in the state where the vehicle 10 is in operation.

In step S21, the lane change unit 20 determines whether the automated driving switch 64 is on. If the automated driving switch 64 is on, the process advances to step S22, and if the automated driving switch 64 is off, the lane change control process ends.

In step S22, the lane change unit 20 determines whether the P mode, the R mode, or the N mode is selected as the transmission mode. If the P mode, the R mode, or the N mode is selected, the lane change control process ends, and if the P mode, the R mode, and the N mode are not selected, the process advances to step S23.

In step S23, the lane change request acquisition unit 16 determines whether the direction indication switch 66 has been operated. If the direction indication switch 66 has been operated, the process advances to step S24, and if the direction indication switch 66 has not been operated, the lane change control process ends. If the automated driving switch 64 is on and the direction indication switch 66 has been operated, it means that the lane change request acquisition unit 16 has acquired the lane change request from the user.

Note that if the lane change unit 20 determines that the vehicle 10 will change lanes, and if the lane change control is started without the user's operation for the direction indication switch 66, step S23 may be performed as follows.

In step S23, the lane change request acquisition unit 16 determines whether the signal indicating the lane change request has been acquired from the lane change unit 20. If the signal indicating the lane change request has been acquired, the process advances to step S24, and if the signal indicating the lane change request has not been acquired, the lane change control process ends.

In step S24, the lane change unit 20 determines whether the D mode is selected as the transmission mode. If the D mode is selected, the process advances to step S27, and if the D mode is not selected, the process advances to step S25.

In step S25, the lane change unit 20 determines whether the D manual mode is selected as the transmission mode. If the D manual mode is selected, the process advances to step S26, and if the D manual mode is not selected, the process advances to step S28.

In step S26, the lane change unit 20 selects the D mode as the transmission mode, and the process advances to step S27.

In step S27, the lane change unit 20 performs the lane change control in the direction to which the direction indication switch 66 has been operated on the basis of the surrounding situation of the host vehicle 10 acquired by the surrounding situation acquisition unit 18, and the lane change control process ends. After the lane change control in step S27, the lane change unit 20 keeps the transmission mode in the lane change control. That is to say, in step S26, even if the transmission mode is changed from the D manual mode to the D mode, the lane change unit 20 keeps the D mode after the lane change control.

If neither the D mode nor the D manual mode is selected as the transmission mode (NO in step S24 and step S25), it means that the S mode or the S manual mode is selected. In this case, the process advances to step S28. In step S28, the lane change unit 20 suppresses the lane change control, and the process ends. Suppressing the lane change control means that the lane change control is not performed.

Third Embodiment

The lane change control process in the vehicle control device 12 according to a third embodiment is different from that in the vehicle control device 12 according to the first embodiment. In addition, the selection lever 94 according to the present embodiment can select each mode by using by-wire technology. The other configurations and the like in the third embodiment are the same as those in the first embodiment.

[Lane Change Control Process]

Figure 9:
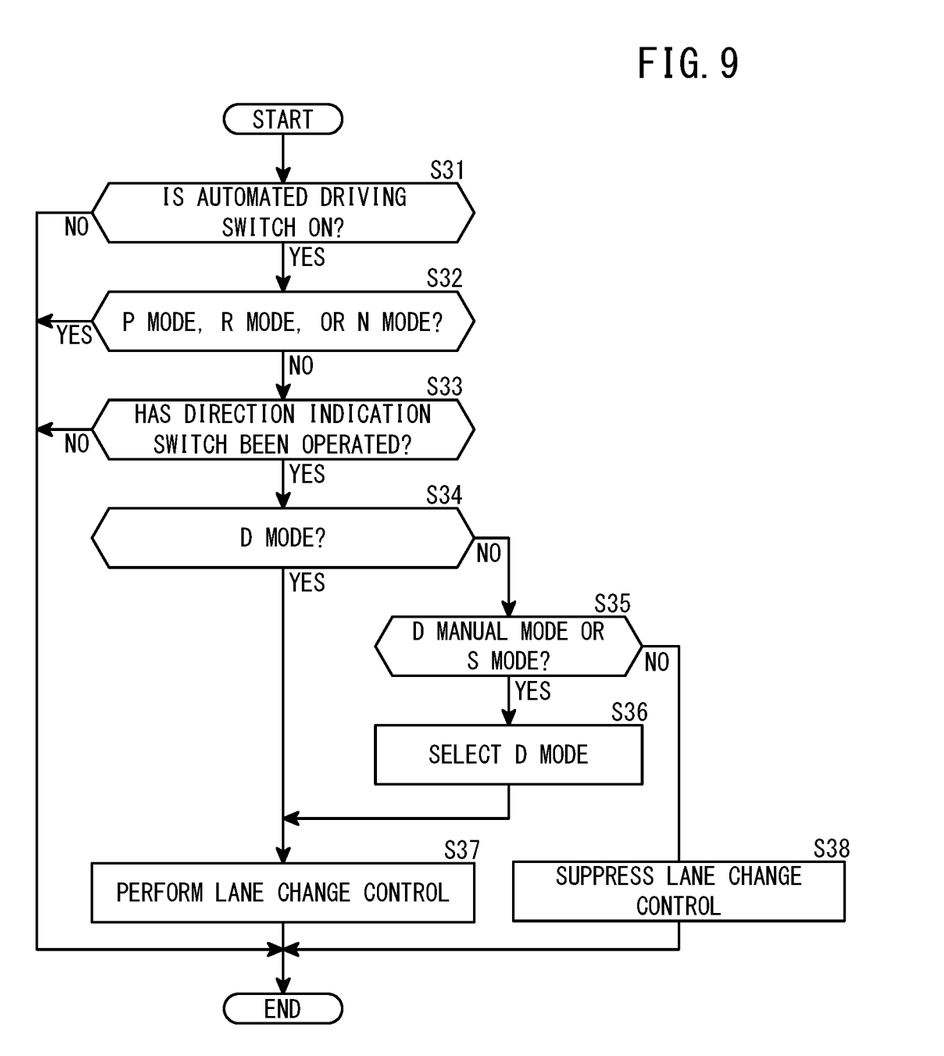
FIG. 9 is a flowchart illustrating the lane change control process performed in the vehicle control device.

FIG. 9 is a flowchart illustrating the lane change control process performed by the vehicle control device 12 according to the present embodiment. The lane change control process is performed on the predetermined cycle in the state where the vehicle 10 is in operation.

In step S31, the lane change unit 20 determines whether the automated driving switch 64 is on. If the automated driving switch 64 is on, the process advances to step S32, and if the automated driving switch 64 is off, the lane change control process ends.

In step S32, the lane change unit 20 determines whether the P mode, the R mode, or the N mode is selected as the transmission mode. If the P mode, the R mode, or the N mode is selected, the lane change control process ends, and if none of these modes, i.e., the P mode, the R mode, and the N mode, are selected, the process advances to step S33.

In step S33, the lane change request acquisition unit 16 determines whether the direction indication switch 66 has been operated. If the direction indication switch 66 has been operated, the process advances to step S34, and if the direction indication switch 66 has not been operated, the lane change control process ends. If the automated driving switch 64 is on and the direction indication switch 66 has been operated, it means that the lane change request acquisition unit 16 has acquired the lane change request from the user.

Note that if the lane change unit 20 determines that the vehicle 10 will change lanes, and if the lane change control is started without the user's operation for the direction indication switch 66, step S33 may be performed as follows.

In step S33, the lane change request acquisition unit 16 determines whether the signal indicating the lane change request has been acquired from the lane change unit 20. If the signal indicating the lane change request has been acquired, the process advances to step S34, and if the signal indicating the lane change request has not been acquired, the lane change control process ends.

In step S34, the lane change unit 20 determines whether the D mode is selected as the transmission mode. If the D mode is selected, the process advances to step S37, and if the D mode is not selected, the process advances to step S35.

In step S35, the lane change unit 20 determines whether the D manual mode or the S mode is selected as the transmission mode. If the D manual mode or the S mode is selected, the process advances to step S36, and if the D manual mode and the S mode are not selected, the process advances to step S38.

In step S36, the lane change unit 20 selects the D mode as the transmission mode, and the process advances to step S37.

In step S37, the lane change unit 20 performs the lane change control in the direction to which the direction indication switch 66 has been operated on the basis of the surrounding situation of the host vehicle 10 acquired by the surrounding situation acquisition unit 18, and the lane change control process ends. After the lane change control in step S37, the lane change unit 20 keeps the transmission mode in the lane change control. That is to say, in step S36, even if the transmission mode is changed from the D manual mode or the S mode to the D mode, the lane change unit 20 keeps the D mode after the lane change control.

If none of these modes, i.e., the D mode, the D manual mode, and the S mode, are selected as the transmission mode (NO in step S34 and step S35), it means that the S manual mode is selected. In this case, the process advances to step S38. In step S38, the lane change unit 20 suppresses the lane change control, and the process ends. Suppressing the lane change control means that the lane change control is not performed.

Technical Concept Obtained from Embodiments

The technical concept that is obtained from the above embodiments is hereinafter described.

The vehicle control device (12) includes: the transmission control unit (14) configured to select, as the transmission mode, the restricted mode in which the range of the gear ratio of the transmission is restricted and the unrestricted mode in which the range of the gear ratio is not restricted, and configured to control the gear ratio in accordance with the selected transmission mode; the lane change request acquisition unit (16) configured to acquire the lane change request; and the lane change control unit (20) configured to, if the unrestricted mode is selected in the case where the lane change request has been acquired, keep the unrestricted mode and perform the lane change control in which the host vehicle (10) changes lanes, and if the restricted mode is selected in the case where the lane change request has been acquired, select the unrestricted mode and perform the lane change control. Thus, in the lane change control of the host vehicle, the lane change control unit can set the gear ratio of the automatic transmission in accordance with the travel state of the host vehicle. Therefore, the host vehicle can accelerate or decelerate smoothly in the lane change control.

In the above vehicle control device, the restricted mode may include the first restricted mode and the second restricted mode, if the first restricted mode is selected, the transmission control unit may be configured to change the transmission mode to the unrestricted mode automatically, and if the second restricted mode is selected, the transmission control unit may be configured not to change the transmission mode to the unrestricted mode automatically, and if the first restricted mode is selected in the case where the lane change request has been acquired, the lane change control unit may be configured to select the unrestricted mode and perform the lane change control, and if the second restricted mode is selected in the case where the lane change request has been acquired, the lane change control unit may be configured to suppress the lane change control. Thus, the shift position or the gear ratio intended by the user is achieved, and at the same time, the lane change control is not performed in the state where the host vehicle cannot accelerate or decelerate smoothly in the lane change control.

In the vehicle control device, if the restricted mode is selected in the case where the lane change request has been acquired, the lane change control unit may be configured to select the unrestricted mode and perform the lane change control, and after the lane change control, the lane change control unit may be configured to keep the unrestricted mode. Although the lane to which the host vehicle has shifted is different from the original lane in the travel environment, the host vehicle can travel smoothly by the unrestricted mode.

In the vehicle control device, if the restricted mode is selected in the case where the lane change request has been acquired, the lane change control unit may be configured to select the unrestricted mode and perform the lane change control, and after the lane change control is canceled, the lane change control unit may be configured to return the transmission mode to the restricted mode. If the lane change control is canceled, the host vehicle returns to the original lane whose travel environment is the travel environment before the lane change control is started. Thus, when the transmission mode is returned to the restricted mode that was selected before the lane change control, the shift position or the gear ratio that is suitable for the travel environment of the host vehicle is selected.

In the vehicle control device, if the transmission control unit selects the restricted mode during the lane change control, the lane change control unit may be configured to keep the unrestricted mode. Thus, in the lane change control of the host vehicle, the lane change control unit can set the gear ratio of the automatic transmission in accordance with the travel state of the host vehicle. Therefore, the host vehicle can accelerate or decelerate smoothly in the lane change control.

The vehicle (10) includes the above vehicle control device. Thus, in the lane change control of the host vehicle, the lane change control unit can set the gear ratio of the automatic transmission in accordance with the travel state of the host vehicle. Therefore, the host vehicle can accelerate or decelerate smoothly in the lane change control.

The vehicle control method includes: the transmission control step of selecting, as the transmission mode, the restricted mode in which the range of the gear ratio of the transmission is restricted and the unrestricted mode in which the range of the gear ratio is not restricted, and controlling the gear ratio in accordance with the selected transmission mode; the lane change request acquisition step of acquiring the lane change request; and the lane change control step of, if the unrestricted mode is selected in the case where the lane change request has been acquired, keeping the unrestricted mode and performing lane change control in which the host vehicle (10) changes lanes, and if the restricted mode is selected in the case where the lane change request has been acquired, selecting the unrestricted mode and performing the lane change control. Thus, in the lane change control of the host vehicle, the lane change control unit can set the gear ratio of the automatic transmission in accordance with the travel state of the host vehicle. Therefore, the host vehicle can accelerate or decelerate smoothly in the lane change control.

The present invention is not particularly limited to the embodiment described above, and various modifications are possible without departing from the gist of the present invention.

What is claimed is:

1. A vehicle control device comprising:
   a transmission control unit configured to select, as a transmission mode, a drive manual mode in which a gear ratio of a transmission is selectable by a user and a drive mode in which a range of the gear ratio is not restricted, and configured to control the gear ratio in accordance with the selected transmission mode;
   a lane change request acquisition unit configured to acquire a lane change request; and
   a lane change control unit configured to, in a case where the lane change request has been acquired, perform lane change control in which a host vehicle changes lanes in accordance with the transmission mode, wherein
   if the drive mode has been selected in an automated driving control at a time when the lane change request is acquired, the lane change control unit is configured to keep the drive mode and perform the lane change control, and if the drive manual mode is has been selected in the automated driving control at the time when the lane change request is acquired, the lane change control unit is configured to select the drive mode and perform the lane change control;
   the transmission mode includes: the drive manual mode; the drive mode; a sport manual mode in which a gear ratio of the transmission is selectable by a user; and a sport mode in which a range of the gear ratio is not restricted;
   if the drive manual mode is selected, the transmission control unit is configured to change the transmission mode to the drive mode automatically in a case where a cruise travel state of the host vehicle is determined, and if the sport manual mode is selected, the transmission control unit is configured not to change the transmission mode to the sport mode automatically; and
   if the drive manual mode has been selected in the automated driving control at a time when the lane change request is acquired, the lane change control unit is configured to select the drive mode and perform the lane change control, and if the sport manual mode has been selected in the automated driving control at a time when the lane change request is acquired, the lane change control unit is configured to suppress the lane change control.

2. The vehicle control device according to claim 1, wherein if the drive manual mode is has been selected in the automated driving control at a time when the lane change request is acquired, the lane change control unit is configured to select the drive mode and perform the lane change control, and after the lane change control, the lane change control unit is configured to keep the drive mode.

3. The vehicle control device according to claim 1, wherein if the drive manual mode has been selected in the automated driving control at a time when the lane change request is acquired, the lane change control unit is configured to select the drive mode and perform the lane change control, and after the lane change control is canceled, the lane change control unit is configured to return the transmission mode to the drive manual mode.

4. The vehicle control device according to claim 1, wherein if the transmission control unit selects the drive manual mode while the lane change control is being performed under the drive mode in the automated driving control, the lane change control unit is configured to keep the drive mode.

5. The vehicle control device according to claim 1, wherein if the sport mode has been selected in the automated driving control at a time when the lane change request is acquired, the lane change control unit is configured to keep the sport mode and perform the lane change control.

6. The vehicle control device according to claim 5, wherein if the user attempts to shift gears while the lane change control is being performed under the sport mode in the automated driving control, the lane change control unit is configured to keep the sport mode.

7. A vehicle comprising a vehicle control device, the vehicle control device including:
   a transmission control unit configured to select, as a transmission mode, a drive manual mode in which a gear ratio of a transmission is selectable by a user and a drive mode in which the range of the gear ratio is not restricted, and configured to control the gear ratio in accordance with the selected transmission mode;
   a lane change request acquisition unit configured to acquire a lane change request; and
   a lane change control unit configured to, in a case where the lane change request has been acquired, perform lane change control in which the vehicle changes lanes in accordance with the transmission mode, wherein
   if the drive mode has been selected in an automated driving control at a time when the lane change request is acquired, the lane change control unit is configured to keep the drive mode and perform the lane change control, and if the drive manual mode has been selected in the automated driving control at a time when the lane change request is acquired, the lane change control unit is configured to select the drive mode and perform the lane change control;
   the transmission mode includes: the drive manual mode; the drive mode; a sport manual mode in which a gear ratio of the transmission is selectable by a user; and a sport mode in which a range of the gear ratio is not restricted;

if the drive manual mode is selected, the transmission control unit is configured to change the transmission mode to the drive mode automatically in a case where a cruise travel state of the host vehicle is determined, and if the sport manual mode is selected, the transmission control unit is configured not to change the transmission mode to the sport mode automatically; and if the drive manual mode has been selected in the automated driving control at a time when the lane change request is acquired, the lane change control unit is configured to select the drive mode and perform the lane change control, and if the sport manual mode has been selected in the automated driving control at a time when the lane change request is acquired, the lane change control unit is configured to suppress the lane change control.

8. A vehicle control method comprising:

a transmission control step of selecting, as a transmission mode, a drive manual mode in which a gear ratio of a transmission is selectable by a user and a drive mode in which a range of the gear ratio is not restricted, and controlling the gear ratio in accordance with the selected transmission mode;

a lane change request acquisition step of acquiring a lane change request; and a lane change control step of, in a case where the lane change request has been acquired, performing lane change control in which a host vehicle changes lanes in accordance with the transmission mode, wherein in the lane change control step if the drive mode has been selected in an automated driving control at a time when the lane change request is acquired, keeping the drive mode and performing the lane change control, and if the drive manual mode has been selected in the automated driving control at a time when the lane change request is acquired, selecting the drive mode and performing the lane change control;

wherein the transmission mode includes: the drive manual mode; the drive mode; a sport manual mode in which a gear ratio of the transmission is selectable by a user; and a sport mode in which a range of the gear ratio is not restricted;

in the lane change control step, if the drive manual mode is selected, change the transmission mode to the drive mode automatically in a case where a cruise travel state of the host vehicle is determined, and if the sport manual mode is selected, not to change the transmission mode to the sport mode automatically; and in the lane change control step, if the drive manual mode has been selected in the automated driving control at a time when the lane change request is acquired, select the drive mode and perform the lane change control, and if the sport manual mode has been selected in the automated driving control at a time when the lane change request is acquired, suppress the lane change control.

* * * * *